Dec. 2, 1952   F. LYIJYNEN   2,620,014
APPARATUS FOR MAKING LAMINATED ARTICLES
Filed March 24, 1948   3 Sheets-Sheet 1

INVENTOR.
Fred Lyijynen.
BY Elmer Jamison Gray
ATTORNEY.

Dec. 2, 1952 F. LYIJYNEN 2,620,014
APPARATUS FOR MAKING LAMINATED ARTICLES
Filed March 24, 1948 3 Sheets-Sheet 2

INVENTOR.
Fred Lyijynen.
BY
Elmer Jamison Gray
ATTORNEY.

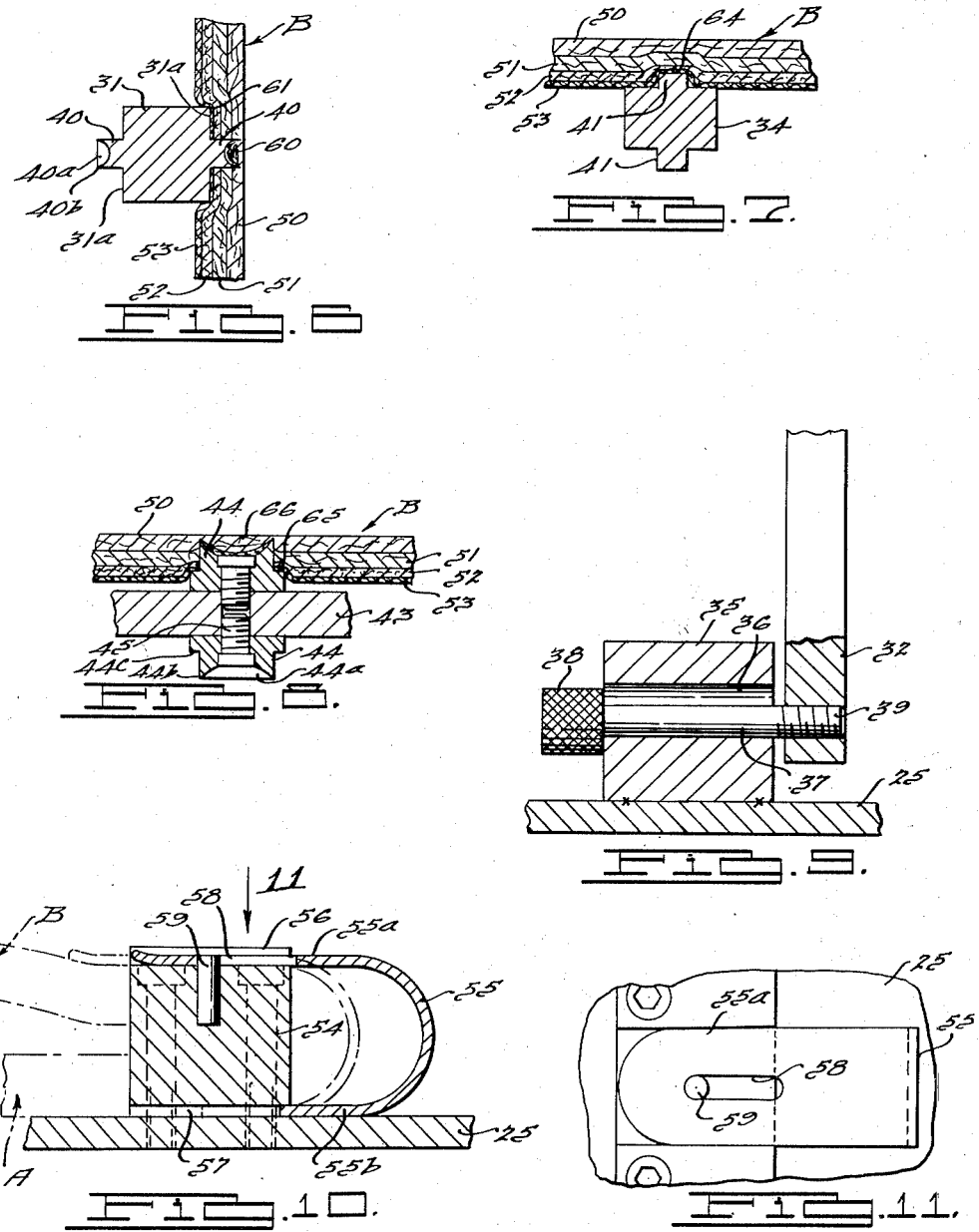

Patented Dec. 2, 1952

2,620,014

UNITED STATES PATENT OFFICE 2,620,014

APPARATUS FOR MAKING LAMINATED ARTICLES

Fred Lyijynen, Detroit, Mich., assignor to Briggs Manufacturing Company, Detroit, Mich., a corporation of Michigan Application March 24, 1948, Serial No. 16,706

14 Claims. (Cl. 154—1)

This invention relates to the fabrication of articles formed of laminations of sheet material bonded together, such as by means of resinous substances, the invention particularly relating to an improved method and apparatus for forming panels useful for trimming the interiors of automobile or other vehicle bodies.

In the fabrication of trim panels for automobile bodies, such as for finishing the insides of the doors thereof, it is customary to arrange in superimposed relation a number of laminations or layers of material and to consolidate the same together between upper and lower heated dies or platens of a press through the medium of resinous materials. During each cycle of operation of the press a single panel is thus produced within a given area between the dies. It will be apparent that the time consumed by a complete cycle of press operation to produce one panel enters materially into the cost of manufacture, particularly when it is considered that a substantial dwell of the press in the closed position thereof is required in order to complete the curing of the resins used to bond the laminations together, such dwell representing loss of productive time of the press as well as the press operators.

One of the chief objects of the invention is to reduce the cost of manufacturing articles, such as trim panels, by increasing the output of the press and reducing the idle and non-productive time of both press and press operators per unit of output.

A further object of the invention is to provide a means and method for forming in a press two trim panels or the like in a single operation and in the same area between the upper and lower die members or platens of the press, thus substantially doubling production at no appreciable increase in labor expense and, as a consequence, reducing greatly the cost of the panels.

Still another object of the invention is to provide a single means for consolidating together at predetermined areas or along predetermined ornamental lines and in one operation a pair of superimposed laminated panels, such means comprising preferably a die in the form of a skeleton frame or a number of connected die members adapted to be interposed between two sets of panel laminations and to impress simultaneously therein similar indentations, grooves or depressions along the lines or in the areas where the laminations are consolidated together.

Another object of the invention is to pierce or form holes or apertures in the panel laminations at opposite sides of the die frame during the operation of consolidating together the laminations of a pair of superimposed panels between which the die frame is located. Also an object of the invention is to provide a common means for locating the two sets of panel laminations correctly with respect to each other and to the interposed die frame and further to limit the closing movement of the movable ram or member of the press so as to prevent excessive pressure on the panel laminations, particularly as a consequence of variations in the thickness thereof.

A further object of the invention is to provide improved die means, shiftable into and out of a press, for simultaneously consolidating together a pair of superimposed laminated panels, such die means comprising a supporting plate and a die hinged thereto so as to permit two sets of panel laminations to be placed one below and the other above the die, located in proper relation and clamped in position to the supporting plate. With the panel laminations thus arranged on the supporting plate the assembly is inserted into the press and the latter closed to effect simultaneously compression of the two sets of panel laminations and, consequently, the formation of two laminated panels in one operation.

Other objects of this invention will appear in the following description and appended claims, reference being had to the accompanying drawings forming a part of this specification wherein like reference characters designate corresponding parts in the several views.

Fig. 6 is an enlarged fragmentary section taken substantially through lines 6—6 of Fig. 3 looking in the direction of the arrows.

Fig. 7 is an enlarged fragmentary section taken substantially through lines 7—7 of Fig. 3 looking in the direction of the arrows.

Fig. 8 is an enlarged fragmentary section taken substantially through lines 8—8 of Fig. 3 looking in the direction of the arrows.

Fig. 9 is an enlarged fragmentary section taken substantially through lines 9—9 of Fig. 3 looking in the direction of the arrows.

Fig. 10 is an enlarged fragmentary section taken substantially through lines 10—10 of Fig. 3 looking in the direction of the arrows.

Fig. 11 is a fragmentary plan view taken in the direction of the arrow 11 in Fig. 10.

Figure 1:
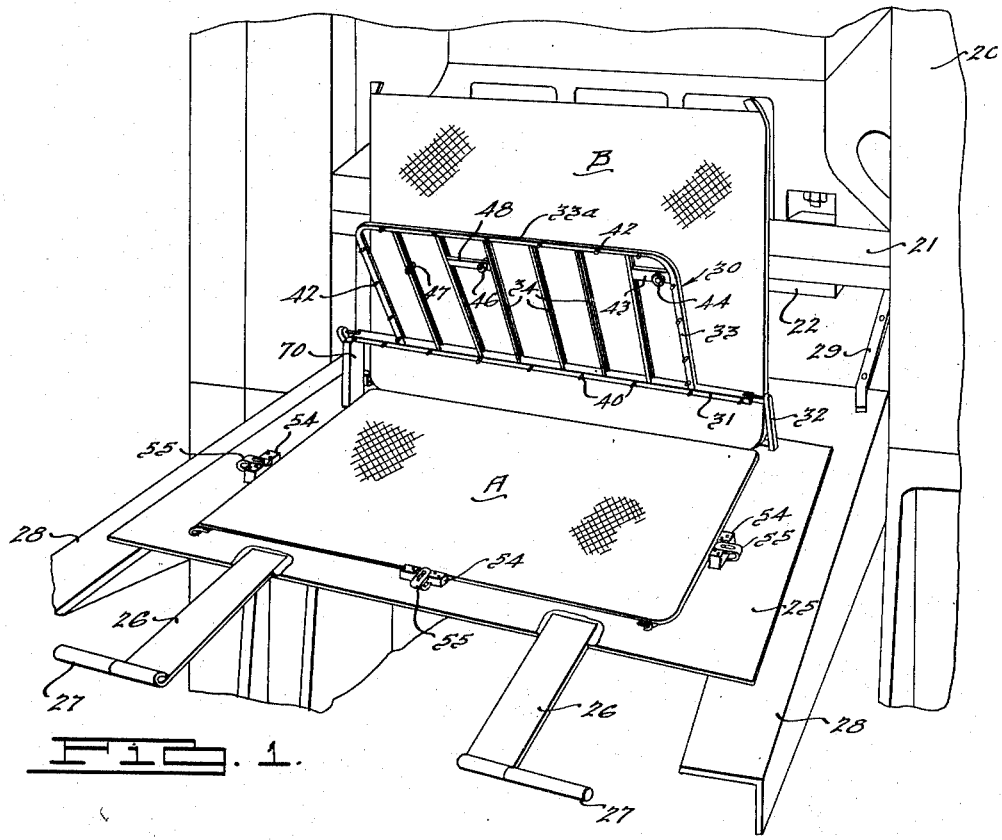
Fig. 1 is a fragmentary perspective view illustrating a removable die unit, constructed in accordance with the present invention, in position outside a press and showing for the purpose of clarity the hinged die in raised position with a pair of panels at opposite sides thereof.
Figure 2:
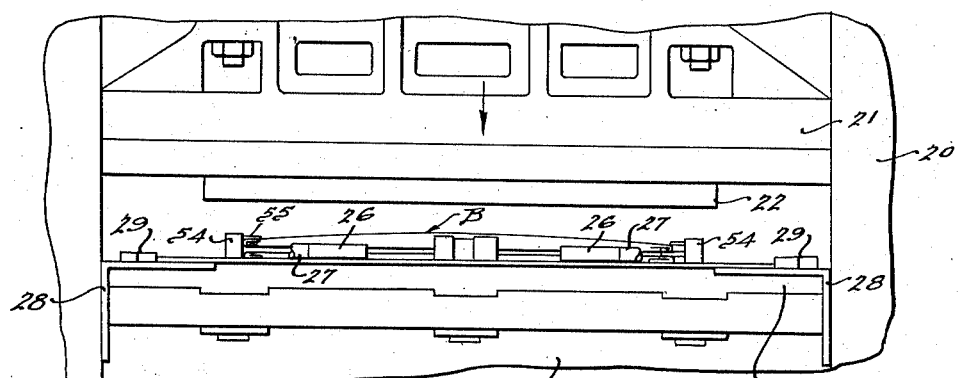
Fig. 2 is a fragmentary front elevation of the press illustrating the die and panel assembly in position within the press preparatory to a pressing operation.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the invention as applied to a removable die unit or apparatus for consolidating together within a suitable press two sets of panel laminations to produce in one operation a pair of trim panels, such as those illustrated at A and B. At 20 there is illustrated a portion of a suitable press which is preferably of the hydraulic type having an upper vertically reciprocable ram 21 carrying an upper heated platen 22 which has a flat bottom face. The press also comprises the usual bed 23 upon which is mounted a lower heated platen or bed plate 24 having a top flat face upon which the die unit of the present invention may be slid into and out of the press.

The die unit constructed in accordance with the present embodiment of the invention comprises a flat base plate 25 of suitable gage to the front edge of which are secured a pair of projecting arms 26 which may be formed of sheet metal of suitable gage. Attached to the outer ends of these arms are a pair of handles 27 which may be grasped by the workman in order to shift the die unit into and out of the press. Any suitable means may be provided for supporting the die unit outside the press during the operations of loading the die unit and removing the finished panels therefrom. Such supporting means in the present instance takes the form of a pair of angle brackets 28 attached to the frame of the press and extending outwardly therefrom so as to support the base plate 25 in the manner shown in Fig. 1. The base plate may be guided into the press by means of spaced guide strips 29 secured to the fixed bottom platen 24 at opposite sides thereof.

One form of die 30 for simultaneously operating on two superimposed panels is illustrated in the present embodiment of the invention, this die comprising a skeleton frame made up of connected bars which together form a complete die member adapted to produce impressions in two sets of panel laminations, arranged at opposite faces of the die, upon descent of the ram 21 to close the press. In the illustrated example the die 30 comprises a rear bar 31 to the opposite ends of which are rigidly secured a pair of projecting arms 32. The die also comprises a generally U-shaped bar 33 rigidly secured at opposite ends to the rear bar 31 and projecting forwardly therefrom in a common plane. The die bar 31 and front portion 33a of the U-shaped die bar 33 are rigidly connected together through the medium of a series of transverse die bars 34. The number, configuration and arrangement of the various bars or members forming the die 30 will, of course, depend upon the particular pattern or design to be impressed in the panels and, hence, will vary widely to suit the design or pattern as well as the size and shape of the panels. For the purposes of exemplifying the invention panels A and B of generally rectangular shape have been selected and a pattern to be impressed in each panel which corresponds to the arrangement and configuration of the die 30 formed by means of the die bars 31, 33 and 34.

The die 30 is hinged at its rear thereof to the base plate 25 so as to permit it to be raised and lowered for convenience in loading and also removal of the finished panels. Rigidly secured to the rear of the base plate 25 are a pair of hinge blocks 35 which are spaced apart so as to lie between the lower ends of the arms 32. Each block 35, as shown in Fig. 9, is provided with a vertical slot 36 through which extends a hinge pin 37 terminating at its inner end in a knurled head 38 and having a threaded portion 39 at its outer end adapted to be screwed into a tapped hole in the lower end of the arm 32. Each hinge pin 37 has a sliding fit within the slot 36 so as to permit it to shift vertically within the slot to accommodate the thickness of the lower panel A when the die is swung down into engagement therewith.

As illustrated particularly in Fig. 6, the rear die bar 31 is provided with suitable forming surfaces 31a at the upper and lower sides thereof, these surfaces being adapted to contact simultaneously the upper and lower panels and to impress grooves therein. Projecting from the opposed forming surfaces 31a of the die bar 31 are a pair of punches 40 which have concaved recesses 40a of suitable depth terminating in cutting edges 40b. Each transverse die bar 34, as shown in Fig. 7, is provided throughout its length with projecting ribs 41 at opposite upper and lower faces thereof, these ribs providing forming means for simultaneously impressing grooves or indentations in the upper and lower panels. The U-shaped forming bar 33 is constructed in cross section similarly to the bar 31, as shown in Fig. 6, and carries at opposite upper and lower faces thereof a series of punches 42 which in the present instance are similar to the punches 40.

Figure 3:
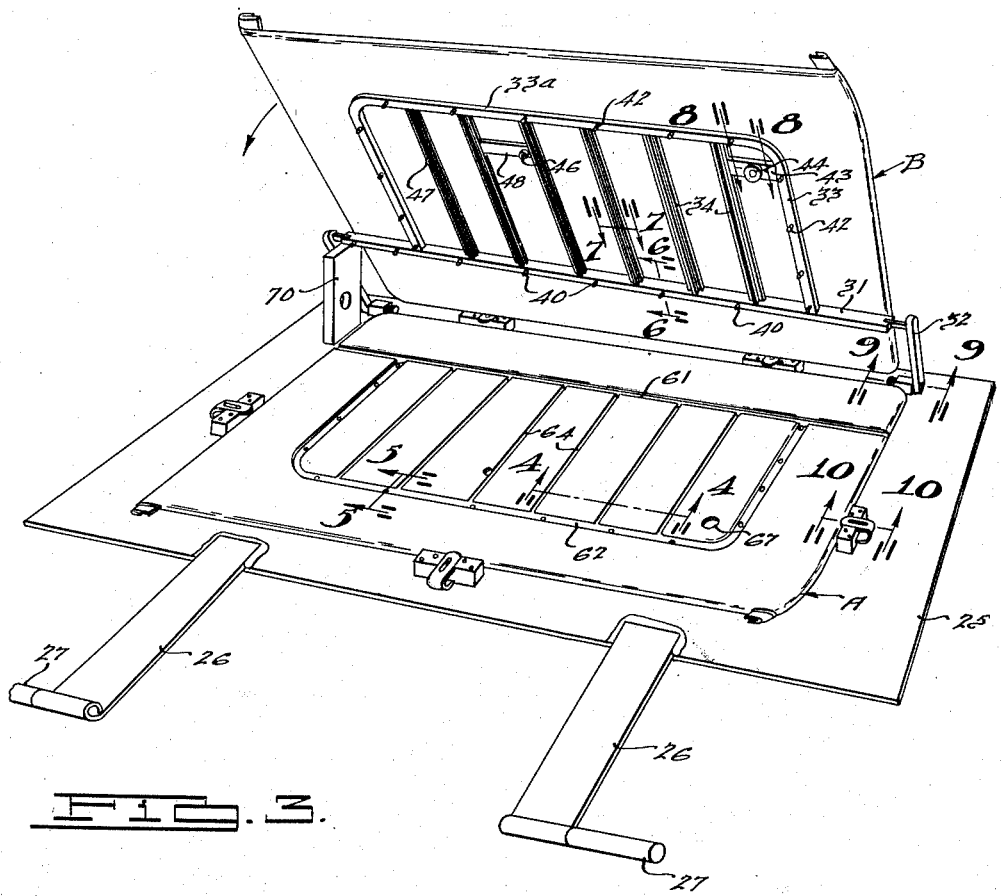
Fig. 3 is a perspective view of the die unit in open position after a pressing operation has been performed upon the two panels shown in this view.
Figure 4:
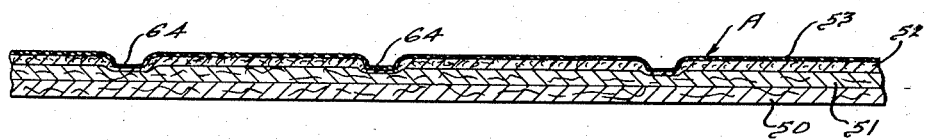
Fig. 4 is an enlarged fragmentary section taken substantially through lines 4—4 of Fig. 3 looking in the direction of the arrows.

The die frame 30 carries means for punching out suitable holes in the upper and lower sets of panel laminations. As illustrated in Fig. 8, a pair of holes may be punched in the superimposed panels in order to receive the shafts for the door handles. A plate 43 extends between and is connected at its ends to one of the bars 34 and to the side of the U-shaped bar 33. Mounted in alignment at opposite sides of this plate 43 are a pair of punches 44 each having a concave recess 44a of suitable depth terminating in a circular cutting edge 44b. In the present instance each punch 44 is stepped to provide an annular shoulder 44c adapted to form an impression in the panel. The punches 44, as shown in Fig. 8, are secured to the plate 43 by means of aligned screws 45 threaded into a tapped hole in the plate, the bottoms of the recesses 44a being countersunk to receive the heads of the screws. As illustrated in Figs. 1 and 3, a second plate 48 connects another pair of the die bars 34 and carries at its upper and lower faces a pair of aligned punches 46 similar to the punches 44 but of smaller diameters so as to punch simultaneously a pair of holes in the superimposed panels. An adjacent die bar 34 also carries a pair of aligned punches 47 of suitable diameter and otherwise similar to the punches 44 for simultaneously punching an additional pair of holes in the superimposed panels. The holes punched by the punches 46 and 47 are utilized in the illustrated trim panel for receiving attaching elements for arm rests.

The patterns impressed in the panels A and B, and the number of holes pierced therein by the identical sets of punches mounted on opposite sides of the die 30, are identical. However, since the panels are superimposed so that their decorative sides are arranged face to face the designs impressed in the panels as well as the arrangement of holes pierced therein will be reversed. As a result the die 30 will produce simultaneously two left and right-hand panels for the use on the corresponding right and left-hand doors of an automobile body. In the present embodiment, therefore, the panels A and B are particularly adapted to be mounted on the insides of two opposite automobile doors so as to form parts of the interior trim thereof. Each panel is formed from a plurality of laminations or sheets which are consolidated together through the medium of suitable resinous materials along the lines of impression formed by the die 30 as well as in the areas around the holes pierced through the laminations by the various punches carried by the die. The laminated structures of the two panels A and B are, in the present instance, identical and for the purposes of illustration the panels may be formed of laminations or sheets in the manner illustrated in Figs. 4 to 8 inclusive. Each panel in the present embodiment comprises a stiff foundation board 50, a relatively thick paper sheet 51 overlying the foundation board, a layer of padding or wadding 52 superimposed upon the sheet 51, and an outer facing sheet or covering layer 53 perferably formed of a fabric material. The foundation sheet or board 50 is preferably formed from a rigid stiff board material providing the desired support for the remaining laminations of the panel. In some instances the material of the foundation board or sheet 50 may be made moisture resistant by impregnation with a resin or an asphalt material. However, in connection with a trim panel intended for use on the interior of an automobile body, I prefer to utilize a heavy composition fiber board, which is not impregnated or treated for moisture resistant purposes.

The resinous or bonding material used for consolidating together the laminations of the trim panel is in the present instance contained entirely in the sheet 51. This sheet preferably comprises a low density absorbent sheet of cellulosic material, such as alpha cellulose or pulp paper, which is not only highly absorbent but also compressible under the action of the die during the hot pressing operation. The sheet 51 is treated or impregnated with a bonding substance preferably in the form of a thermosetting resin, such as a phenol formaldehyde product. Where a resin of this character is used as the bonding agent it is preferred to convert the resinous substance into a varnish by dissolving it in a suitable solvent. The sheet 51 may be impregnated by immersing it in the varnish so that the fibers of the sheet will become saturated. By controlling the percentage of resin contained in the varnish the exact amount of resin introduced into the sheet 51 may be readily controlled in order to produce the desired bonding action. After impregnation the sheet 51 is dried so as to expel the volatile solvent from the sheet, the resinous material remaining in the sheet being partially reacted or polymerized so as to be capable of further reaction or curing when subjected to heat from the platens 22 and 24 during the pressing operation.

The wadding or padding layer 52 comprises any suitable soft deformable material capable of being employed for cushioning the outer surface of the panel. Cotton batting may be used satisfactorily for this purpose. The outer covering sheet 53 may be made of any suitable finishing material adapted to provide the panel with the desired ornamental or decorative appearance. Preferably the sheet 53 is in the form of a cloth material although it will be understood that other fabric material, such for example as artificial leather may be used. Although I prefer to utilize the compressible sheet 51 for carrying the resin or bonding material, since this sheet will readily take impressions from the die, it will be understood that the sheet 51 in some cases may be dispensed with and the bonding material applied directly to the layer of padding or wadding 52.

In carrying out the loading operation a set of laminations or sheets 50—53 are placed one upon another in the relation above described and then positioned upon the upper face of the base plate 25, the die 30 having been first swung upwardly to the position shown in Fig. 1 and temporarily supported in this position by any suitable means, such as by a block 70. The correct location of the panel laminations on the base plate 25 is obtained by means of a number of gage blocks 54 bolted to the base plate 25. In the present instance five gage blocks are provided, two at the rear of the base plate 25 for engagement by the rear edges of the panel laminations, two at the opposite sides of the base plate for engagement by the edges of the laminations, and one gage block at the front of the base plate for engagement by the front edges of the laminations.

As illustrated in Fig. 10, there is mounted on each gage block 54 a U-shaped clamping member 55 which has an upper horizontal arm 55a extending through a slot or groove 56 in the upper face of the gage block so as to lie somewhat below this face. Each clamp 55 also has a shorter lower arm 55b slidable within a slot 57 in the bottom of the gage block. The upper arm of the clamp has a longitudinal guide slot 58 into which extends a stop pin 59 anchored in the block. The clamps 55 carried by the gage blocks may be retracted in the manner shown in full lines in Fig. 10 so as to permit the panel laminations to be introduced and fitted between the gage blocks so as to correctly locate the laminations with respect to one another as well as with respect to the base plate 25. After the panel laminations for the lower panel A have been properly positioned against the gage blocks, as shown in Fig. 1, the die frame 30 is swung down into engagement with the top layer 53 of the panel laminations. Since the hinge connections 37 of the die with the hinge blocks 35 are vertically movable, the die will lie flat upon the bottom panel laminations. With the die resting upon the bottom panel laminations the several laminations for the upper panel B are positioned upon the upper face of the die and the edges thereof are pressed down so as to engage and fit between the inside vertical locating faces of the gage blocks. With these edges of the upper panel laminations held down, as illustrated in dotted lines in Fig. 10, between the gage blocks, the clamps 55 are shifted inwardly so as to clamp and hold down the marginal edges of the upper set of panel laminations in proper positions between the gage blocks. The position of each clamp 55, when thus shifted into clamping position, is shown in dotted lines in Fig. 10. With the panel laminations assembled with the die 30 in the foregoing manner and held in position against the gage blocks by means of the clamps 55, the workman grasps the handles 27 and slides the assembly into the press onto the lower heated platen 24. The ram 21 is then caused to descend, thereby engaging the upper heated platen 22 with the assembled unit and compressing the panel laminations against the lower platen and also against the interposed die 30. The gage blocks 54 also preferably serve the purposes of stop blocks engaged by the platen 22 so as to limit the lowermost travel thereof and prevent the application of excessive pressure by the die 30 against the superimposed panels. The heights of the gage blocks 54 will thus be selected so as to limit the downward stroke of the ram as may be desired, depending upon the thickness of the die as well as the thickness of the panel laminations.

From the foregoing it will be understood that when the ram descends to the full limit of its travel the die 30 will form impressions in the superimposed panels in accordance with the configuration and arrangement of the die bars, and the punches will pierce holes in the panels. As illustrated in Fig. 6, the punches 40 carried by the die bar 31 will simultaneously punch corresponding holes in the panels A and B. Since the material of the laminations 51—53 is compressible sufficient space is provided in the recesses 40a in the punches for the slugs 60 formed by the punching operation, the edges 40b of the punches cutting substantially or nearly through the foundation 50 so as to enable the slugs to be readily knocked or pushed out of the holes formed by the punches. The faces 31a of the die bar 31 form longitudinal grooves or depressions 61 in the adjacent faces of the panels A and B, these grooves being designed in the present instance for the reception of ornamental metal moldings and the holes punched in the bottom of these grooves by the punches 40 being designed to receive fastener elements carried by the molding which are passed through the panel and clinched against the bottom face of the foundation board 50.

Figure 5:
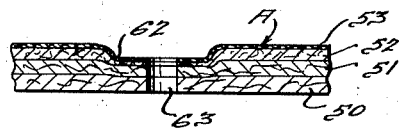
Fig. 5 is an enlarged fragmentary section taken substantially through lines 5—5 of Fig. 3 looking in the direction of the arrows.

The die bar 33 impresses a continuous U-shaped groove or depression 62 in the face of each panel A and B, as illustrated in Fig. 5. These grooves or depressions are also designed to receive ornamental moldings. A series of holes 63 are punched through the bottom of each groove or depression 62 by means of the punches 42 in the same manner as is illustrated in Fig. 6, these holes receiving the fastener elements carried by each molding which pass through the holes and are clinched against the bottom face of the foundation board 50. The ribs 41 provided at opposite faces of the die bars 34 impress narrow grooves or depressions 64 in the panels A and B in the manner illustrated in Figs. 4 and 7. As illustrated in Figs. 3 and 8, the cutting edges 44b of the punches 44 pierce holes 67 in the superimposed panels, these edges penetrating substantially or nearly through the foundation board 50 to permit the slugs 66 to be readily ejected from the holes. The annular shoulders 44c of these punches compress the laminations 51—53 around the margins of the holes 67 so as to consolidate these laminations and bond them together as well as to the foundation board in circular areas extending around the holes.

During the pressing operation the temperature of the heated platens 22 and 24 is so regulated that the resinous material contained in the sheet 51 is cured, but first this material infuses into the fabric covering 53, the padding layer 51 and foundation board 50 so that all of these layers or laminations will be firmly bonded together at the locality where pressure is applied by the die 30, these localities being at the grooves or depressions 61, 62, 64 and 65 above described. Since the resin impregnated sheet 51 is relatively thick and compressible the grooves, depressions or indentations formed by the die members extend partially into this sheet as indicated in Figs. 4 to 8 inclusive. Along these localities the resinous material in the sheet 51 will flow through the compressed wadding 52 into the fabric 53 and also into contact with the foundation board 50 so as to thoroughly consolidate the laminations or layers together at these localities.

I claim:

1. In a die apparatus for forming laminated panels in a press having relatively movable pressing members, comprising a support shiftable into and out of the press between said members, a die unit hinged to said support and comprising a series of spaced frame members provided at opposite sides with projecting ribs for forming indentations or depressions in two sets of panel laminations arranged one set beneath and the other set above said die unit, and means for holding said sets of panel laminations and in engagement with said forming portions.

2. In a die apparatus for forming laminated panels in a press having relatively movable pressing members, comprising a support shiftable into and out of the press between said members, a die unit hinged to said support and having substantially identical oppositely directed punching and embossing portions at opposite sides thereof for forming indentations or depressions in two sets of panel laminations arranged one set beneath and the other set above said die unit, a common means on said support for locating said sets of laminations with the edges thereof in vertically aligned relation, and means for holding the edges of the upper set of laminations in predetermined position with respect to said locating means.

3. A die apparatus for use in a press having relatively movable upper and lower members, comprising a base plate, a die frame hinged to said plate to swing toward and from the same, said frame having raised forming portions arranged back to back in mutually reinforcing relation at the upper and lower faces thereof, means for positioning a set of superimposed sheets on said plate beneath said frame and also for positioning a second set of superimposed sheets on said frame above the same, and means for holding the upper set of sheets in superimposed relation to the lower set with the die frame therebetween, said base plate, frame and sets of sheets being shiftable as a unit into the press, said upper press member having a plane pressing surface confronting said die frame and said press members engaging the base plate and upper set of sheets upon closing the press to compress the sheets against said forming portions.

4. A die apparatus for use in a press having relatively movable upper and lower members, comprising a base plate, a die frame hinged to said plate to swing toward and from the same, said frame having punch portions and forming portions arranged back to back in mutually reinforcing relation at the upper and lower faces thereof, means for positioning a set of superimposed sheets on said plate beneath said frame and also for positioning a second set of superimposed sheets on said frame above the same, and means for holding the upper set of sheets in superimposed relation to the lower set with the die frame therebetween, said base plate, frame and sets of sheets being shiftable as a unit into the press, said upper press member having a plane pressing surface confronting said die frame and said press members engaging the base plate and upper set of sheets upon closing the press to compress the sheets against said forming portions and punch portions.

5. A die apparatus for use in a press having relatively movable upper and lower members, comprising a base plate, a frame hinged to said plate to swing toward and from the same, said frame having punch portions and forming portions at the upper and lower faces thereof, means for positioning a set of superimposed sheets on said plate beneath said frame and also for positioning a second set of superimposed sheets on said frame above the same, said means including gage blocks secured to said base plate, and means for holding the upper set of sheets in superimposed relation to the lower set with the die frame therebetween, said base plate, frame and sets of sheets being shiftable as a unit into the press and said press members engaging the base plate and upper set of sheets upon closing the press to compress the sheets against said forming portions and punch portions, said gage blocks providing stops to limit the relative closing movement of said press members.

6. In an apparatus for forming paired left and right hand panels, a press having relatively vertically movable upper and lower press members, a support shiftable into the press between said members, a die unit supported by said support and shiftable relative thereto for interposition of panel material between the die unit and support, said die unit having substantially identical depression forming portions arranged back to back and raised from the upper and lower faces thereof, thereby to form depressions simultaneously in two sets of panel material disposed one above and one below the die unit, said support having a plane pressing surface directly confronting the lower face of the die unit and the upper press member having a plane pressing surface directly confronting the upper face of the die unit.

7. In an apparatus for forming paired left and right hand panels, a press having relatively movable press members, a support shiftable into the press between said members, a die unit supported by the support and shiftable relative thereto for interposition of panel material between the die unit and support, said die unit having substantially identical depression forming portions arranged back to back and raised from opposite faces thereof, thereby to form depressions simultaneously in two sets of panel material disposed with said die unit therebetween, said support having a plane pressing surface directly confronting one face of the die unit and one of said press members having a plane pressing surface directly confronting the other face of the die unit.

8. In an apparatus for forming paired left and right hand panels, a press having relatively movable press members, a support shiftable into the press between said members, a die unit supported by the support and shiftable relative thereto for interposition of panel material between the die unit and support, said die unit having a set of punching and depression forming portions raised from one face thereof and a second substantially identical set of punching and depression forming portions raised from the opposite face thereof and arranged back to back with the corresponding portions of the first set in mutually reinforcing relation, thereby to form depressions simultaneously in two sets of panel material disposed with said die unit therebetween, said support having a plane pressing surface directly confronting one face of the die unit to press one of said sets of panel material against said one face of the die unit, and one of said press members having a plane pressing surface directly confronting the other face of the die unit to press the other of said sets of panel material against said other face of the die unit.

9. In an apparatus for forming paired left and right hand panels, a press having relatively vertically movable upper and lower press members, a support shiftable into the press between said members, a die unit supported by said support and shiftable relative thereto for interposition of panel material between the die unit and support, said die unit having substantially identical depression forming portions arranged back to back and raised from the upper and lower faces thereof, thereby to form depressions simultaneously in two sets of panel material disposed one above and one below the die unit, said support having a plane pressing surface directly confronting the lower face of the die unit and the upper press member having a plane pressing surface directly confronting the upper face of the die unit, and locating means on said support for positioning said two sets of panel material above and below said die unit.

10. In an apparatus for forming paired left and right hand panels, a press having relatively movable press members, a support shiftable into the press between said members, a die unit supported by the support and shiftable relative thereto for interposition of panel material between the die unit and support, said die unit having a set of punching and depression forming portions raised from one face thereof and a second substantially identical set of punching and depression forming portions raised from the opposite face thereof and arranged back to back with the corresponding portions of the first set in mutually reinforcing relation, thereby to form depressions simultaneously in two sets of panel material disposed with said die unit therebetween, said support having a plane pressing surface directly confronting one face of the die unit to press one of said sets of panel material against said one face of the die unit, and one of said press members having a plane pressing surface directly confronting the other face of the die unit to press the other of said sets of panel material against said other face of the die unit, and locating means on said support for positioning said two sets of panel material above and below said die unit.

11. In an apparatus for forming paired left and right hand panels, a press having relatively vertically movable upper and lower press members, a support shiftable into the press between said members, a die unit pivoted on the support and comprising oppositely directed depression forming rib portions arranged back to back and adapted to form depressions simultaneously in two sets of panel material disposed one above and one below the die unit, said support having a pressing surface directly confronting the lower face of the die unit to press one of said sets of panel material against said lower face, and the upper press member having a pressing surface directly confronting the upper face of the die unit to press the other of said sets of panel material against said upper face.

12. In an apparatus for forming paired left and right hand panels, a press having relatively vertically movable upper and lower press members, a support shiftable into the press between said members, a die unit pivoted on the support and comprising oppositely directed depression forming rib portions arranged back to back and adapted to form depressions simultaneously in two sets of panel material disposed one above and one below the die unit, said support having a pressing surface directly confronting the lower face of the die unit to press one of said sets of panel material against said lower face, and the upper press member having a pressing surface directly confronting the upper face of the die unit to press the other of said sets of panel material against said upper face, and means on said support engageable with the edges of said panel material to position and clamp the same in place.

13. In an apparatus for forming a pair of left and right hand panels, a press having relatively vertically movable upper and lower press members, a support shiftable into the press between said members, a die unit carried by said support and comprising oppositely directed depression forming die portions arranged back to back and adapted to form depressions simultaneously in two sets of panel material disposed one above and one below the die unit, said support having a pressing surface confronting the lower face of the die unit to press one of said sets of panel material against said lower face, and the upper press member having a pressing surface confronting the upper face of the die unit to press the other of said sets of panel material against said upper face.

14. In an apparatus for forming a pair of left and right hand panels, a press having relatively vertically movable upper and lower press members, a support shiftable into the press between said members, a die unit carried by said support and comprising oppositely directed depression forming die portions arranged back to back and adapted to form depressions simultaneously in two sets of panel material disposed one above and one below the die unit, said support having a pressing surface confronting the lower face of the die unit to press one of said sets of panel material against said lower face, the upper press member having a pressing surface confronting the upper face of the die unit to press the other of said sets of panel material against said upper face, and means on said support for positioning said sets of panel material relative to said die portions.

FRED LYIJYNEN.

REFERENCES CITED

The following references are of record in the file of this patent:

UNITED STATES PATENTS

| Number | Name | Date |
|---|---|---|
| Re. 15,279 | Matthews | Jan. 31, 1922 |
| 666,468 | Clear | Jan. 22, 1901 |
| 1,281,462 | Wills | Oct. 15, 1918 |
| 1,387,617 | Roberts | Aug. 16, 1921 |
| 1,863,800 | Loetscher | June 21, 1932 |
| 2,090,325 | Deubel | Aug. 17, 1937 |
| 2,209,141 | Schnell | July 23, 1940 |
| 2,303,198 | Cunnington | Nov. 24, 1942 |
| 2,425,082 | Bolston | Aug. 5, 1947 |
| 2,431,048 | Kilborn | Nov. 18, 1947 |
| 2,442,422 | Loetscher | June 1, 1948 |